United States Patent
Manolescu et al.

(10) Patent No.: US 10,187,765 B2
(45) Date of Patent: Jan. 22, 2019

(54) NETWORKED SENSOR ARRAY

(71) Applicant: Apple Inc., Cupertino, CA (US)

(72) Inventors: Dragos Manolescu, Kirkland, WA (US); Jean-Paul Bonjour, Dublin, CA (US)

(73) Assignee: Apple Inc., Cupertino, CA (US)

( * ) Notice: Subject to any disclaimer, the term of this patent is extended or adjusted under 35 U.S.C. 154(b) by 37 days.

(21) Appl. No.: 15/275,267

(22) Filed: Sep. 23, 2016

(65) Prior Publication Data

US 2018/0091928 A1 Mar. 29, 2018

(51) Int. Cl.
*H04W 4/38* (2018.01)
*H04W 4/02* (2018.01)
*H04W 88/02* (2009.01)

(52) U.S. Cl.
CPC ............. *H04W 4/38* (2018.02); *H04W 4/023* (2013.01); *H04W 88/02* (2013.01)

(58) Field of Classification Search
None
See application file for complete search history.

(56) References Cited

U.S. PATENT DOCUMENTS

| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |

(Continued)

FOREIGN PATENT DOCUMENTS

| JP | 2000-163031 A | 6/2000 |
| JP | 2002-342033 A | 11/2002 |
| WO | WO-2012/148395 A1 | 11/2012 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Hong S Cho
(74) *Attorney, Agent, or Firm* — Morrison & Foerster, LLP

(57) ABSTRACT

An electronic device is disclosed. In some examples, the electronic device comprises a first sensor configured to measure a first type of sensor data at a first sampling rate. In some examples, the electronic device comprises a communication interface configured to: detect a proximity of one or more network capable devices, different from the electronic device, form a sensor network with at least one of the one or more network capable devices, exchange operational parameters with the at least one of the one or more network capable devices, and coordinate data measurement by the first sensor based on the exchanged operational parameters. In some examples, coordinating measuring of data by the first sensor further comprises selecting the reduced sampling rate of the first sensor based on a total number of devices participating in the sensor network having sensors capable of measuring the first type of sensor data.

20 Claims, 11 Drawing Sheets

(56) References Cited

U.S. PATENT DOCUMENTS

| | | | |
|---|---|---|---|
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 9,280,884 | B1 | 3/2016 | Schultz et al. |
| 2006/0197753 | A1 | 9/2006 | Hotelling |
| 2010/0255830 | A1* | 10/2010 | Manolescu ............. H04W 4/38 455/418 |
| 2014/0124647 | A1 | 5/2014 | Hsu |
| 2015/0106020 | A1 | 4/2015 | Chung et al. |
| 2016/0058390 | A1* | 3/2016 | Dyell ................. G06F 19/3418 340/870.07 |
| 2016/0164563 | A1* | 6/2016 | Khawand ............ H04B 1/3838 455/127.2 |
| 2017/0012972 | A1* | 1/2017 | Tanaka .................... G06F 1/163 |
| 2017/0140644 | A1* | 5/2017 | Hwang ................. G08C 17/02 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

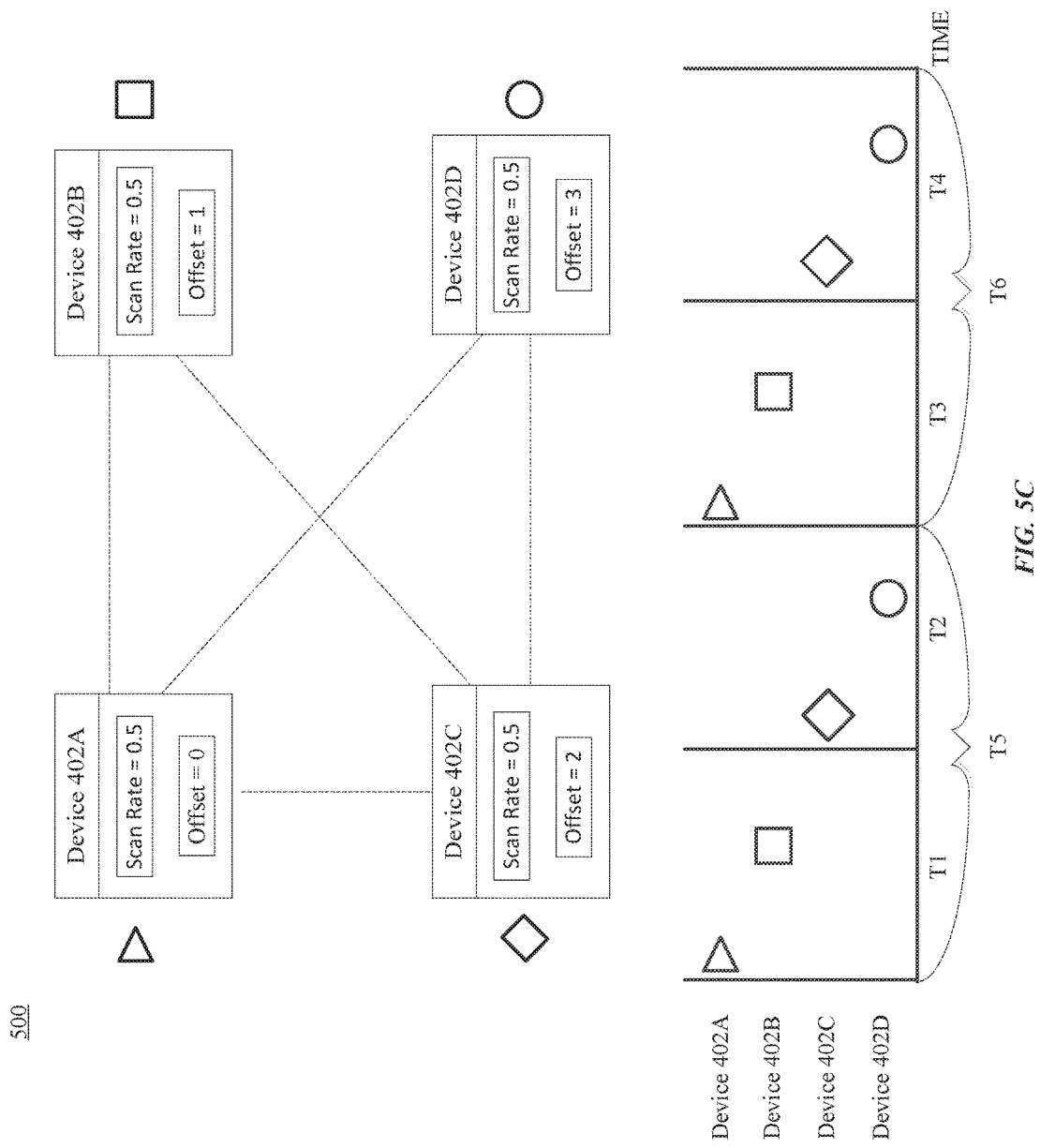

NETWORKED SENSOR ARRAY

FIELD OF THE DISCLOSURE

This relates generally to networked electronic devices, and more particularly, to networking for sharing sensor data captured by multiple electronic devices.

BACKGROUND OF THE DISCLOSURE

The inclusion of sensors in portable electronic devices has become increasingly popular. During a group activity, users of such devices can expect that individual specific sensor measurements such as heart rate will differ. However, during the same group activity, the users might expect that sensors generating user-invariant data such as distance travelled and elevation gained should produce consistent measurement results among different devices. The existence of extrinsic variables, i.e., variables that can affect measurement values but are not intended to be measured such as temperature and/or humidity, can cause two user devices engaged in the same activity to report different sensor measurement values (e.g., distance traveled). This type of discrepancy can cause users to question the validity and accuracy of sensor measurement data obtained by their devices.

SUMMARY

Examples of the disclosure relate to methods and apparatus for a networked sensor array that can utilize data from multiple devices belonging to users engaged in a group activity. In some examples, by forming a networked sensor array during an activity (such as a group exercise activity), the sensor data from multiple devices can be shared and used to reduce errors due to the presence of extrinsic variables. In some examples, data can be shared between devices to replace missing and/or corrupted data (e.g., a first device's missing or corrupted data can be replaced with data obtained by a second device participating in the networked sensor array). In some examples, both missing and corrupted data can be referred to as anomalous data. In some examples, an increased amount of total data (e.g., from multiple devices simultaneously measuring the same activity) can be used to obtain a more accurate result aggregated from multiple devices. In some examples, the sample rate of sensors in individual devices in the networked sensor array can be reduced to save power without losing overall accuracy relative to measurements from a single device. In some examples, both an increase in the amount of total data and a reduction in power consumption can be achieved simultaneously. In some examples, a final measurement result determined from aggregated data can be shared between the devices so that each device participating in the networked sensor array reports the same measurement value (e.g., distance traveled or elevation gained) for the same activity. In some examples, a device that is in a low power mode or a device that shuts off due to a low battery can obtain measurement data from devices of other users participating in a group activity after normal battery power levels are restored.

BRIEF DESCRIPTION OF THE DRAWINGS

FIGS. 5A-5D illustrate exemplary scan sequences for a networked sensor array according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Examples of the disclosure relate to methods and apparatus for a networked sensor array that can utilize data from multiple devices engaged in the same group activity. In some examples, by forming a networked sensor array during an activity (such as a group exercise activity), the sensor data of multiple devices can be shared and used to reduce errors due to the presence of extrinsic variables. In some examples, data can be shared between devices to replace missing and/or corrupted data (e.g., a first device's missing or corrupted data can be replaced with data obtained by a second device participating in the networked sensor array). In some examples, an increased amount of total data (e.g., from multiple devices simultaneously measuring the same activity) can be used to obtain a more accurate result aggregated from multiple devices. In some examples, a final measurement result determined from aggregated data can be shared between the devices so that each device participating in the networked sensor array reports the same measurement value (e.g., distance traveled or elevation gained) for the same activity. In some examples, the sample rate of sensors in individual devices in the networked sensor array can be reduced to save power without losing overall accuracy relative to measurements from a single device. In some examples, a device that is in a low power mode or a device that shuts off due to a low battery can obtain measurement data from devices of other users participating in a group activity after normal battery power levels are restored.

Figure 1A:
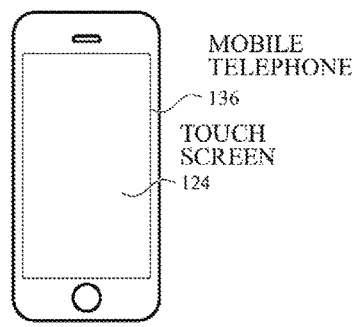
FIGS. 1A-1D illustrate examples of devices that can participate in a networked sensing array according to examples of the disclosure.
Figure 1B:
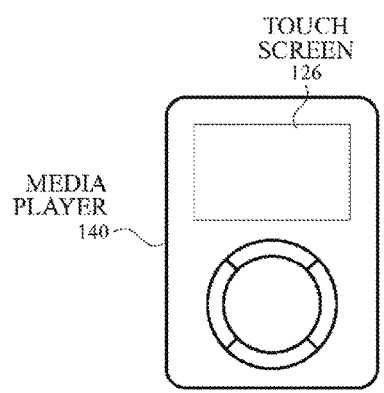
Figure 1C:
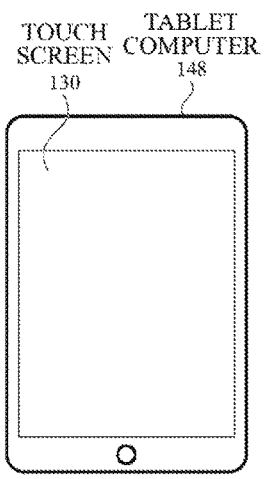
Figure 1D:
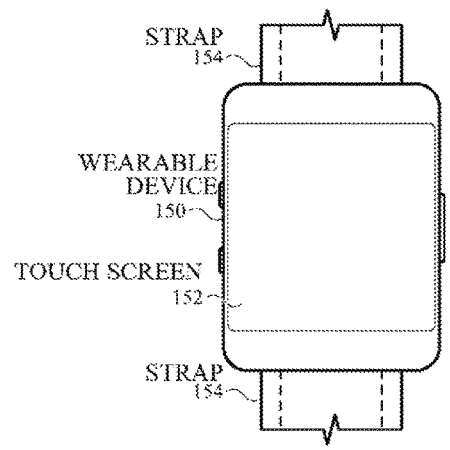

FIGS. 1A-1D illustrate examples of devices that can participate in a networked sensing array according to examples of the disclosure. FIG. 1A illustrates an exemplary mobile telephone 136 that includes a touch screen 124 that can participate in a networked sensor array according to examples of the disclosure. FIG. 1B illustrates an example digital media player 140 that includes a touch screen 126 that can participate in a networked sensor array according to examples of the disclosure. FIG. 1C illustrates an example tablet computing device 148 that includes a touch screen 130 that can participate in a networked sensor array according to examples of the disclosure. FIG. 1D illustrates an example wearable device 150 (e.g., a watch) that includes a touch screen 152 that can participate in a networked sensor array according to examples of the disclosure. Wearable device 150 can be coupled to a user via strap 154 or any other suitable fastener. It should be understood that the example devices illustrated in FIGS. 1A-1D are provided by way of example, and other types of devices can participate in a networked sensor array as described below. Additionally, although the devices illustrated in FIGS. 1A-1D include touch screens, in some examples, the devices may have a non-touch sensitive display. In some examples, the devices may have no screen at all. In some examples, additional types of devices that can participate in a networked sensor array can include wearable devices such as devices embedded in apparel such as jackets or shoes.

Figure 2:
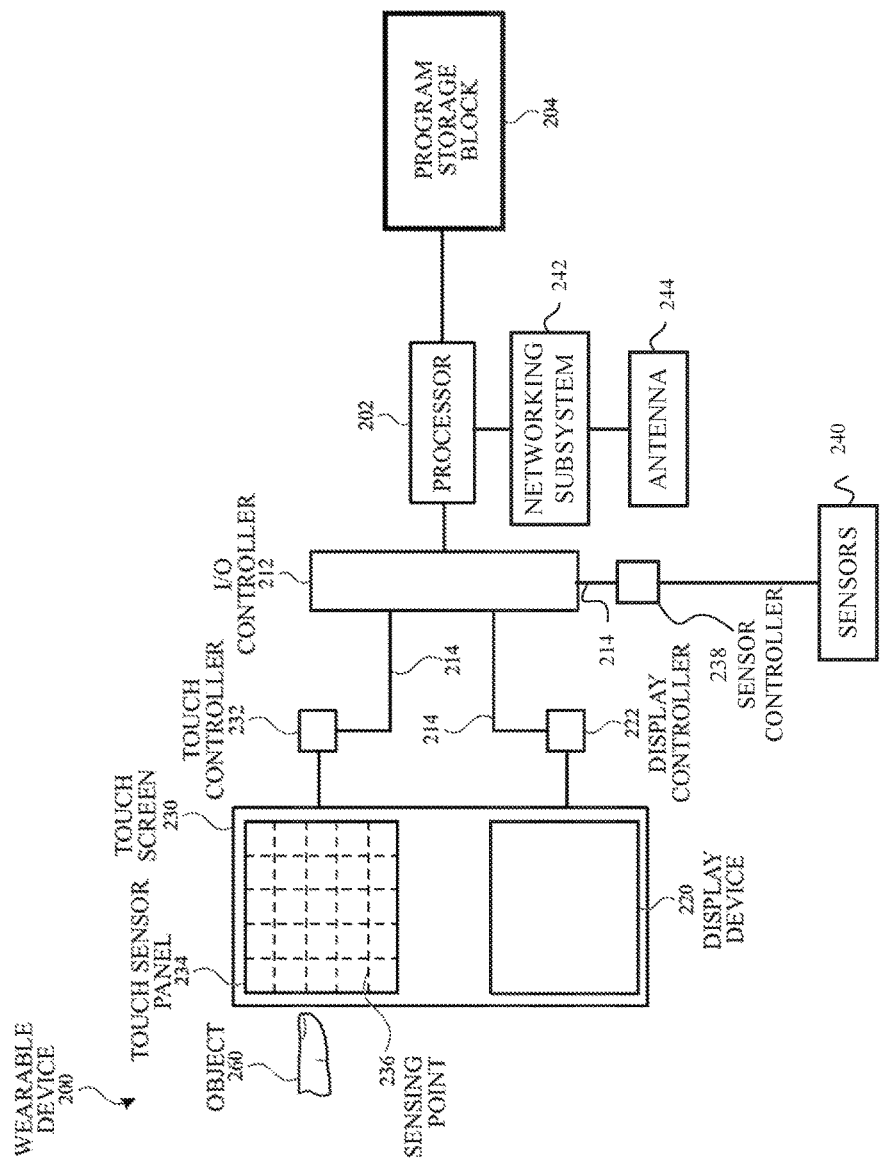
FIG. 2 illustrates an exemplary block diagram of components within an exemplary device according to examples of the disclosure.

FIG. 2 illustrates an exemplary block diagram of components within an exemplary device (e.g., device 200) according to examples of the disclosure. In some examples, device 200 can correspond to devices 136, 140, 148, or 150 above. As illustrated, the device 200 can include a processor 202 configured to execute instructions and to carry out operations associated with the device 200. For example, using instructions retrieved from, for example, memory, the processor 202 may control the reception and manipulation of input and output data between components of the device 200. The processor 202 can be a single-chip processor or can be implemented with multiple components.

In some examples, the processor 202 together with an operating system can operate to execute computer code and produce and use data. The computer code and data may reside within a program storage block 204 that can be operatively coupled to the processor 202. Program storage block 204 can generally provide a place to store data used by the device 200. By way of example, the program storage block may include Read-Only Memory (ROM), Random-Access Memory (RAM), hard disk drives (including solid state drives), flash memory and/or the like. The computer code and data can also reside on a removable storage medium that can be loaded or installed onto the computer system when needed. Removable storage mediums can include, for example, flash memory, SD Card, microSD, CD-ROM, PC-CARD, floppy disk, magnetic tape, a network component, and the like.

The device 200 can also include an input/output (I/O) controller 212 that can be operatively coupled to the processor 202. The I/O controller 212 may be integrated with the processor 202 or it may be one or more separate components. The I/O controller 212 can be configured to control interactions with one or more I/O devices. The I/O controller 212 can operate by exchanging data between the processor 202 and the I/O devices that desire to communicate with the processor. The I/O devices and the I/O controller can communicate through one or more data links 214. The one or more data links 214 may include data links that have a one way link or two way (bidirectional) link. In some examples, the I/O devices may be coupled to I/O controller 212 through wired connections. In other examples, the I/O devices may be wirelessly coupled to I/O controller 212. By way of example, the one or more data links 214 can correspond to one or more of PS/2, USB, Firewire, IR, RF, BLUETOOTH™ or the like.

Device 200 can also include a display device 220 that can be operatively coupled to the processor 202. For example, as illustrated in FIG. 2, display device 220 can be coupled to a display controller 222, and display controller 222 can be coupled to I/O controller 212. In other examples, the functionality of display controller 222 can be implemented in I/O controller 212 or processor 202, and display device 220 can be coupled to I/O controller 212 or directly to processor 202. Display device 220 can be a separate component (peripheral device) or it can be integrated with the processor and/or program storage in a single device. Display device 220 can be configured to display a graphical user interface (GUI) including, for example, a pointer or cursor or other information to the user.

Device 200 can also optionally include a touch screen 230 that can be operatively coupled to processor 202. Touch screen 230 can include a transparent or semi-transparent touch sensor panel 234 that can be positioned, for example, in front of the display device 220. Touch sensor panel 234 may be integrated with the display device 220 (e.g., touch sensing circuit elements of the touch sensing system can be integrated into the display pixel stack-ups of the display) or it may be a separate component. Touch screen 230/touch sensor panel 234 can be configured to receive input from an object 260 (e.g., a finger) touching or proximate to touch screen 230/touch sensor panel 234 and to send this information (e.g., presence of touch and/or magnitude of touch signals) to processor 202. Touch screen 230 can report the touch information to processor 202, and processor 202 can process the touch information in accordance with its programming. For example, processor 202 may initiate a task in accordance with a particular touch event.

In some examples, optional touch screen 230 can track one or more objects (e.g., object 260), which hover over, rest on, tap on, or move across the touch-sensitive surface of touch screen 230. The objects can be conductive objects including, but not limited to, fingers, palms, and styli. Touch screen 230 can include a sensing device, such as touch sensor panel 234, configured to detect an object touching or in close proximity thereto and/or the force or pressure exerted thereon.

Touch sensor panel 234 can be based on a wide variety of technologies including self-capacitance, mutual capacitance, resistive and/or other touch sensing technologies. In some examples, touch sensor panel 234 can include a matrix of small plates of conductive material (e.g., ITO) that can be referred to as sensing points, nodes or regions 236. For example, a touch sensor panel 234 can include a plurality of individual sensing nodes, each sensing node identifying or representing a unique location on the touch screen at which touch or proximity (hovering) (i.e., a touch or proximity event) is to be sensed, and each sensing node being electrically isolated from the other sensing nodes in the touch screen/sensor panel. Such a touch sensor panel/screen can be referred to as a pixelated touch sensor panel/screen. During self-capacitance operation of the pixelated touch screen, for example, a sensing node can be stimulated with an AC waveform, and the self-capacitance of the sensing node can be measured. As an object approaches the sensing node, the self-capacitance to ground of the sensing node can change. This change in the self-capacitance of the touch node can be detected and measured by the touch sensing system to determine the positions of one or more objects when they touch, or come in proximity to, the pixelated touch screen.

The number and configuration of the sensing points 236 may be widely varied. The number of sensing points 236 can, for example, be a tradeoff between the desired sensitivity (resolution) and the desired transparency of the touch screen. More nodes or sensing points can generally increase sensitivity, but can also, in some examples, reduce transparency (and vice versa). With regards to the configuration, the sensing points 236 can map the touch screen plane into a coordinate system such as a Cartesian coordinate system, a Polar coordinate system, or some other coordinate system. When a Cartesian coordinate system is used (as shown), the sensing points 236 can correspond to x and y coordinates. When a Polar coordinate system is used, the sensing points 236 can correspond to radial (r) and angular coordinates (φ).

Although touch sensor panel 234 is illustrated and described above with reference to FIG. 2 as a pixelated touch sensor panel, in other examples, the touch sensor panel can be formed from rows and columns of conductive material (row-column touch sensor panel), and changes in the self-capacitance to ground of the rows and columns can be detected. Additionally or alternatively, in some examples, the touch sensor panel or row-column touch sensor panel can be configured to sense changes in mutual capacitance at sensing nodes measuring capacitive coupling between two electrodes (e.g., at the intersection of a drive and a sense electrode). In some examples, a touch screen can be multi-touch, single touch, projection scan, full-imaging multi-touch, capacitive touch, etc.

Touch screen 230 can include and/or be operatively coupled to a touch controller 232 that can perform touch sensing scans and acquire the touch data from touch sensor panel 234 and that can supply the acquired data to processor 202. For example, as illustrated in FIG. 2, touch screen 230 can be coupled to touch controller 232, and touch controller 232 can be coupled to I/O controller 212. In other examples, the functionality of touch controller 232 can be implemented in I/O controller 212 or processor 202, and touch screen 230 can be coupled to I/O controller 212 or directly to processor 202. The touch screen 230 can be a separate component (peripheral device) or it can be integrated with the processor and/or program storage in a single device.

In some examples, touch controller 232 can be configured to send raw touch data to processor 202, and processor 202 can process the raw touch data. For example, processor 202 can receive data representative at touch measured at sensing points 234, process the data to identify touch events, and then take actions based on the identified touch events. The touch data may include the coordinates of each sensing point 234 and/or the force measured at each sensing point 234. In some examples, touch controller 232 can be configured to process the raw data and then transmit identified touch events and location information to processor 202. Touch controller 232 can include a plurality of sense channels, logic and/or other processing circuitry (not shown) that may perform optimization and/or touch detection operations. Optimization operations can be implemented to reduce a busy data stream and reduce the load on processor 202. In some examples, processor 202 can perform at least some of the optimization operations. The touch detection operations can include, acquiring raw data (e.g., scanning the touch sensor panel), adjust the raw data (e.g., compensating the touch image), performing centroid calculations, identifying touch events, etc. before sending or reporting information to processor 202.

Touch screen 230 and touch controller 232 can be referred to as the touch sensing system. Touch controller 232 can include or be coupled to one or more touch processors (not shown) to perform some of the processing functions described herein. Touch controller 232 can include circuitry and/or logic configured to sense touch inputs on touch screen 230 as described herein. In some examples, touch controller 232 and the one or more touch processors can be integrated into a single application specific integrated circuit (ASIC).

Device 200 can include a plurality of sensors 240 for collecting data about the operation of the device as well as a user's interaction with the device. The sensors can be optionally controlled by one or more sensor control systems 238 that can be connected by data links 214 to the I/O controller 212 and/or processor 202. Exemplary sensors 240 can include, but are not limited to GPS, altimeters, inertial measurement units (IMUs), heart rate monitors or other biometric sensors (e.g., photoplethysmogram (PPG) sensors), and microphones. In some examples, data from sensors 240 can be shared over a networked sensor array with other devices as will be described in more detail below.

In some examples, device 200 can also include a networking subsystem 242 connected to the processor 202 or the I/O controller 212. In some examples, a communications link can be established using networking subsystem 242 and antenna 244 of device 200. The networking subsystem can be configured to communicate with different protocols, (e.g., Bluetooth, WiFi, Cellular, etc.). In some examples, the networking subsystem 242 can be used to connect to infrastructure networks, which can have dedicated hardware available for general purpose network connections. In some examples, the networking subsystem can be used to connect to a peer-to-peer network, i.e., a network that is formed between devices without relying on dedicated networking hardware. In some examples, the peer-to-peer network can be formed for the purpose of sharing data from sensors 240 between multiple devices during an agreed upon session (e.g., a group exercise activity). In some examples, a network formed between multiple devices for sharing data from sensors 240 between multiple devices can be referred to as a networked sensor array. In some examples, the networking subsystem 242 can also be used to connect to other networks, including the Internet. To conserve power, networking subsystem 242 and antenna 244 of device 200 can enter a low power or no power consumption standby mode when there is no information or data being communicated over the communications link. When information or data is being communicated during communications intervals, networking subsystem 242 and antenna 244 can switch to an active mode. In some examples, the communications intervals can be periodic. In some examples, the active mode can consume a higher amount of power than the standby mode.

In some examples, processor 202 can be a host processor for receiving outputs from various I/O devices and performing actions based on the outputs. Processor 202 can be connected to program storage block 204. For example, processor 202 can be operably coupled to receive signals from touch sensor panel 234. Processor 202 can be configured to interpret these input signals and output appropriate display signals to cause an image to be produced by touch-sensitive display 220. The inputs, individually or in combination, can also be used to perform other functions for device 200. For example, processor 202 can contribute to generating an image on touch screen 230 (e.g., by controlling a display controller to display an image of a user interface (UI) on the touch screen), and can use touch controller 232 to detect one or more touches on or near touch screen 230. The inputs from touch screen 230 and/or mechanical inputs can be used by computer programs stored in program storage block 204 to perform actions in response to the touch and/or mechanical inputs. For example, touch inputs can be used by computer programs stored in program storage block 204 to perform actions that can include moving an object such as a cursor or pointer, scrolling or panning, adjusting control settings, opening a file or document, viewing a menu, making a selection, executing instructions, operating a peripheral device connected to the host device, answering a telephone call, placing a telephone call, and other actions that can be performed in response to touch inputs. Mechanical inputs can be used by computer programs stored in program storage block 204 to perform actions that can include changing a volume level, locking the touch screen, turning on the touch screen, taking a picture, and other actions that can be performed in response to mechanical inputs. Processor 202 can also perform additional functions that may not be related to touch and/or mechanical input processing.

Note that one or more of the functions described above can be performed by firmware stored in memory in device 200 and executed by touch processor in touch controller 232, or stored in program storage block 204 and executed by processor 202. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
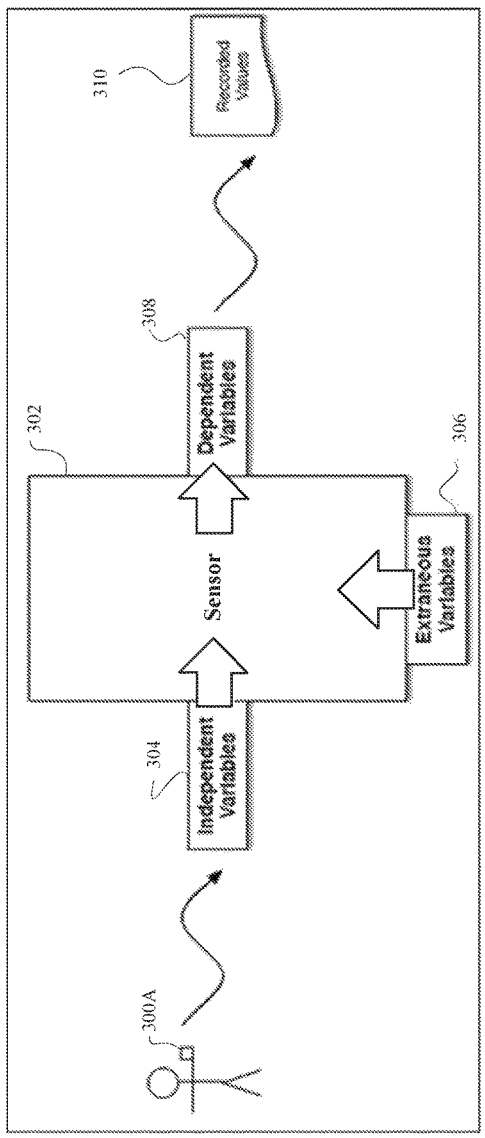
FIGS. 3A-3B illustrate exemplary block diagrams for measurement processes of a single sensor and a networked sensor array according to examples of the disclosure.
Figure 3B:
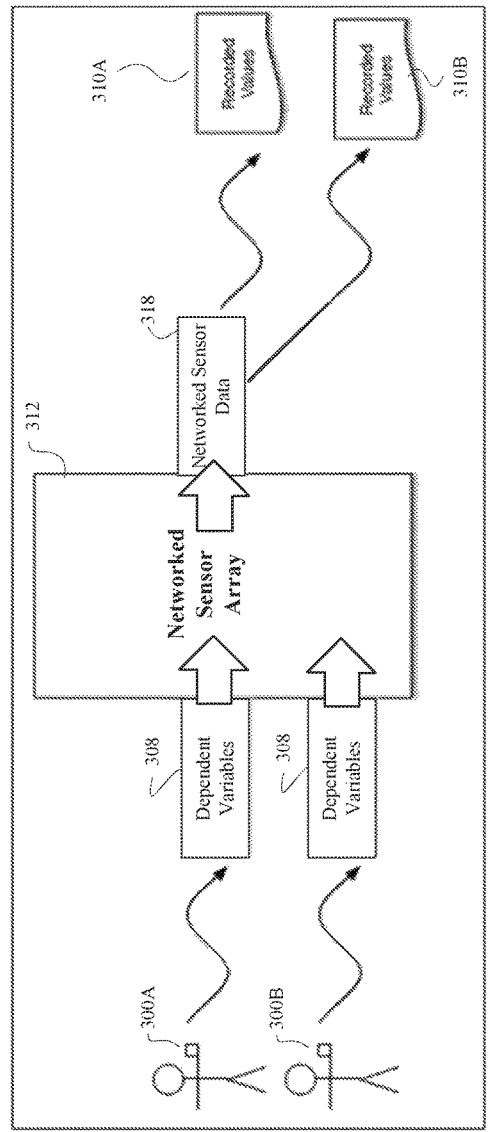

FIGS. 3A-3B illustrate exemplary block diagrams for measurement processes of a single sensor and a networked sensor array according to examples of the disclosure. FIG. 3A illustrates an exemplary measurement process that can be a sensor measurement process of a single sensor 302 in a user's device 300A. In some examples, an electronic device 300A (which can correspond to devices 136, 140, 148, or 150 above) can utilize an array of sensors (e.g., sensors 240 above) that can be used to take readings (sometimes referred to as a sensor scan herein), which can further be translated into measurements such as heart rate, stride length, turnover rate, distance travelled, elevation change, etc. Each sensor 302 in device 300 can be viewed conceptually as a measurement instrument performing an experiment. In some examples, independent variables 304 can be variables that are being influenced directly by the user's actions. The independent variables 304 can represent the information that the measurement process performed by sensor 302 is intended to measure. The output of the sensor can be the dependent variables 308, which can depend at least in part on the independent variables 304. Exemplary independent variables can include heart rate, distance travelled, elevation change, and acceleration. However, extraneous variables 306 (i.e., variables that are not intended to be measured) can also have an influence on the values of the dependent variables produced by sensor 302. An example extraneous variable that can frequently affect electronic sensors is temperature, which can influence measurement output values of many different types of electronic sensors. Other extraneous variables that can influence sensor output data can be wind, atmospheric pressure, humidity or the like. In some examples, user behavior can also act as an extraneous variable that can affect measurement of the independent variable. For example, a user may receive a telephone call during the group activity, and while using the telephone may stop swinging their arm (e.g., during a jog). In some examples, the stationary arm position while using the telephone may prevent the sensor 302 from correctly obtaining measurement data (e.g., when the sensor is in the telephone or in a wearable device worn on the same arm being used to hold the telephone to the user's head). As described above, the output of the sensor 302 can be used to generate dependent variables 308 that can represent measurement of the desired independent variable. In some examples, the dependent variables 308 from the sensor 302 can be stored as recorded values 310 that a user or application can later access. It should be understood that not all extraneous variables are necessarily weather related, but rather, any factor that influences sensor data output but is not the intended to be measured can be considered an extraneous variable. It should further be understood that concepts of the networked sensor array described herein can be applied to other types of sensor measurements not explicitly described herein while remaining within the scope of the present disclosure.

FIG. 3B illustrates an exemplary measurement process that can represent a sensor measurement process for a networked sensor array 312 according to examples of the disclosure. In some examples, each electronic device 300A-300B that has individual measurement sensors (e.g., 302 above) included in it can be regarded as its own measurement instrument. In some examples, multiple users, each with their own device 300A-300B can be engaged in a group activity; for example, two people may jog along an essentially identical path together from beginning to end. In some examples, some of the sensor measurements obtained during the jog can be specific to a user, such as heartrate and stride frequency. In some examples, some of the sensor measurements obtained during the jog can be common for both users, such as the total distance traveled during the jog. However, due to each device 300A-300B being its own measurement instrument, a different result for total distance traveled may be recorded by each device. This discrepancy between measured sensor output (which can show two different distances traveled in the example above) and the joggers' perception of traveling the same distance can diminish the user experience as well as creating doubt about the accuracy of sensor measurements from the device. In some examples, the networked sensor array 312 can be used to facilitate sharing of data between devices 300A-300B. In some examples, devices 300A-300B can provide the dependent variable 308 (i.e., measurement results) output from individual sensors 302 to the networked sensor array. In some examples, the networked sensor data 318 (i.e., data from the different devices 300A-300B) can be made available to each of the devices participating in the networked sensor array and can optionally be used to produce recorded values 310A-310B corresponding to devices 300A-300B, respectively.

In some examples, the discrepancy between measured sensor 302 outputs of distance travelled can be partially or completely the result of a number of missing and/or erroneous data points in the collected sensor data for each individual sensor. In some examples, an aggregation of the individual errors, which can be the result of extraneous variables 306 above, can cause each of the two systems to produce different results for a measurement that is expected to be the same for both users (e.g., total distance traveled). In such an example, it can be advantageous to allow the individual sensors (e.g., 302 above) of the two joggers' devices to obtain replacement data based on data obtained by their partners' device via the networked sensor array 312. For example, a first jogger's device may have 1% of its data missing or having data errors (e.g., a data point outside of the expected range). By connecting the devices via the networked sensor array 312, the first jogger's device 300A may obtain replacement data from the second jogger's device 300B (e.g., from the networked sensor data 318) to replace the missing and/or erroneous 1% of data. In some examples, once the data is replaced, the two joggers' devices 300A-300B may agree on a total distance traveled.

It can also be noted that when two users are performing essentially the same activity, the total amount of data being captured by the devices 300A-300B can be doubled relative to each device in standalone mode, as each device can be capturing a full set of data. In some examples, rather than merely replacing missing and/or erroneous data to reconcile discrepancies, one or both of the devices 300A-300B can analyze both sets of data (e.g., from the networked sensor data 318) to provide a more accurate measurement result.

In some examples, the two joggers of the present example may not experience a problem with inconsistent measurement results between individual device sensors 302 or the two joggers may prefer saving power as a priority over correcting inconsistent readings between sensors of the individual devices 300A-300B. An example scenario that could cause inconsistent measurements between two users jogging together can be the result of one of the users receiving a telephone call during the jog, which can cause the user using the telephone to stop swinging their arms. In some examples, having twice as many sensor samples due to two devices simultaneously sampling may not be necessary or desirable. In such examples, the networked sensor array 312 can be used by the two joggers to reduce the overall power consumed by each device's sensors (e.g., sensors 302 above). In some examples, each jogger's device 300A-300B could adjust the sampling frequency of respective sensors (e.g., sensors 302 above) to half of the standalone frequency, thus saving power. In some examples, the total amount of data captured by the two devices 300 operating at half the standalone frequency can be equal to the amount of data captured by a single device operating at the standalone frequency. Thus, by sharing data (e.g., networked sensor data 318) via the networked sensor array 312, the total amount of power consumed by the frequency adjusted sensors can be reduced without sacrificing the amount of data captured relative to the standalone case. In some examples, only sensors capturing independent variables that are expected to be common among the two devices 300A-300B can be operated at a reduced frequency, while sensors that are measuring user specific variables can be left to operate at the standalone frequency for each device. Although a jogging activity with two joggers is described above, it should be understood that other types of activities can benefit from sharing data (e.g., networked sensor data 318) over the networked sensor array 312 described herein. In addition, the networked sensor array 312 can be scaled to more than two users. The examples below describe a four user activity, but it should be understood that two, three, four, or more users can potentially participate in a networked sensor array 312 while remaining within the scope of the present disclosure. In addition to distance travelled in the jogging example above, other activities may produce user-invariant measurement values including acceleration and elevation change. In one example, a team of rowers participating in a boat rowing session may all experience the same average acceleration due to being located in the same boat. In another example, a group of hikers engaged in a group hiking activity may experience an identical elevation change. While some concepts of the networked sensor array 312 have been described above, additional details regarding exemplary operation of the networked sensor array will be described in further detail in connection with FIGS. 4-7.

Figure 4:
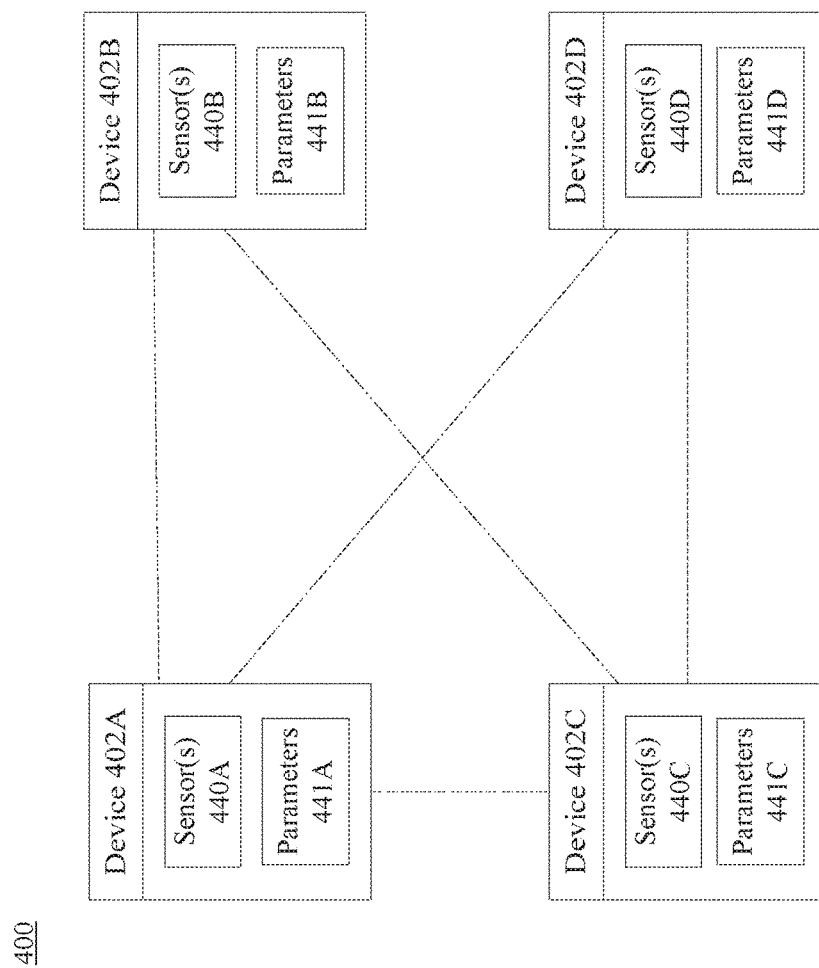
FIG. 4 illustrates an exemplary block diagram of four devices that can participate in a networked sensor array according to examples of the disclosure.

FIG. 4 illustrates an exemplary block diagram of four devices 402A-402D (which can correspond to one or more of devices 136, 140, 148, or 150 above) that can participate in a networked sensor array 400 according to examples of the disclosure. Each of the devices 402A-402D can include one or more sensors 440A-440D (which can correspond to sensors 240 above), as well as parameters 441A-441D (e.g., sample rate, timing offsets, data bit-rate, etc.) related to the operation of the respective device's sensors. It should be understood that a networked sensor array 400 can be formed between different types of devices, e.g., a mobile telephone, two wearable devices, and a tablet computer. The networked sensor array 400 described in the present disclosure can be formed on an ad-hoc basis, for example when a group of users of the devices 402A-402D are engaging in a group exercise activity. In some examples, the users of each device 402A-402D can initiate a networked sensor array 400 by activating an application on the respective devices. In some examples, the devices 402A-402D can automatically detect a presence of other networked sensor array capable devices, and can notify the respective device users of a possible networked sensor array 400. In such examples, the user can elect to include their device in the networked sensor array 400 (i.e., opt-in), as well as select operation preferences for the networked sensor array.

For the purposes of the presented examples, a networked sensor array 400 will be described as part of a group exercise activity. However, it can be understood that networked sensor arrays 400 can be formed for other purposes and situations other than exercise where sharing of sensor data can be utilized. For example, users may be engaged in a group activity of measuring ambient noise with microphones include in respective devices 402A-402D. The dashed lines extending between devices 402A-402D can represent data sharing links that can be formed between respective devices 402A-402D. A direct connection between devices 402B and 402D is intentionally omitted to illustrate that direct connections do not necessarily need to be formed between each of the respective devices, although in some examples all devices can be mutually interconnected. In some examples, one or more of the devices can act as centralized devices (i.e., servers or relays) for distributing data among the devices participating in the group exercise activity. In some examples, only the subset of the devices that are servers or relays may be connected to all other devices (e.g., 402A and 402C as illustrated). In some examples, the respective devices 402A-402D can all send their data to a device that is not participating in the networked sensor array directly (e.g., a cloud based service whereby content and services are delivered over a network such as the Internet) and the distribution of data between the devices can be handled by the non-participating device.

In some examples, once at least two users have elected to join the group exercise activity, a handshaking process can begin for initializing the networked sensor array 400. In some examples, the connection between devices 402A-402D can be formed using networking protocols such as Bluetooth or Wi-Fi. In some examples, a gossip protocol can be utilized for establishing device-to-device communications between devices 402A-402D. In some examples, the devices 402A-402D can exchange information about their respective sensing capabilities. In some examples, devices 402A-402D can exchange information about operational parameters 441-441D related directly or indirectly to the operation of sensors 440A-440D. In some examples, based on the exchanged information, devices 402A-402D can determine which sensors (e.g., 440A-440D) could be treated as inputs to a networked sensor array. In some examples, devices 402A-402D can further determine how measurements obtained as part of the networked sensor array can be processed for an improved user experience (e.g., consistent measurement results for different users performing the same activity). In some examples, devices 402A-402D can exchange information about operational parameters 441-441D related to the operation of sensors 440A-440D. In some examples, when the group exercise activity is triggered, the devices 402A-402D can discover each other and adjust measurement parameters 441A-441D such that the measurement data from individual sensors 440A-440D within the respective devices can be more directly correlated. In some examples, the types of sensors 440A-440D included in each device 402A-402D may not match exactly (i.e., device 402B may have sensor types A, B, and D and device 402C may have sensor types C and E). In some examples, two or more of the devices (e.g., 402B and 402D) may not form a direct connection because they do not have any sensors in common to share data between. In some examples, the devices 402A-402D can perform one or more timing synchronizations. Some exemplary timing synchronizations can include synchronizing time of day and establishing a common time base for collecting sensor data (which can be based on parameters 441A-441D). In some examples, the parameters 441A-441D of devices 402A-402D can be used to adjust sampling frequency and offsets of particular sensors (e.g., of the sensors 440A-440D in each individual device) as will be described in more detail below. In some examples, the frequency (e.g., every minute, every mile, or once at the end of an activity) of data sharing between the networked devices 402A-402D can also be determined during the handshaking step. For example, for some types of networked sensor array 400 operations, data between the devices may be shared only when the networked sensor array mode is about to be terminated, such as when a group activity is complete. In such an example, the data collected by each individual device 402A-402D can be completely or partially shared (e.g., networked sensor data 318 above) with the other networked devices such that data recorded (e.g., recorded values 310A-310B above) at the end of an activity (e.g., a group exercise activity) can be consistent among the devices that participated in the networked sensor array. In other examples, the devices 402A-402D participating in the group exercise activity can periodically share sensor data to maintain synchronization and consistency between the devices during the activity. For example, the shared sensor data can be used so that a notification after each mile traversed occurs at a consistent location for each user if the users are spread out and arriving at the same location at different times. In another example, for two users participating in the group exercise activity that are maintaining the same pace together (e.g., running side by side, seated together in a race boat, etc.) can receive the notification after each mile traversed at exactly the same time, rather than receiving the notifications at slightly different times due to variations in the individual measurements by sensors 440A-440D in each device 402A-402D. In some examples, user preferences for data sharing frequency for individual devices can also be considered during the handshaking step. In some examples, some devices with larger batteries may be able to tolerate sharing data frequently while devices with smaller batteries may only share data at the end of a group activity. In some examples, some of the devices with larger batteries (e.g., tablet computer 148) can act as a server or data relay to the devices with smaller batteries (e.g., wearable device 150), and the larger devices can provide notifications (e.g., push notifications) of significant events (e.g., route waypoints being reached) to the smaller battery devices. Some illustrative examples of various types of data sharing for a networked sensor array 400 will be described in more detail with reference to the FIGS. 5-7 below.

Figure 5A:
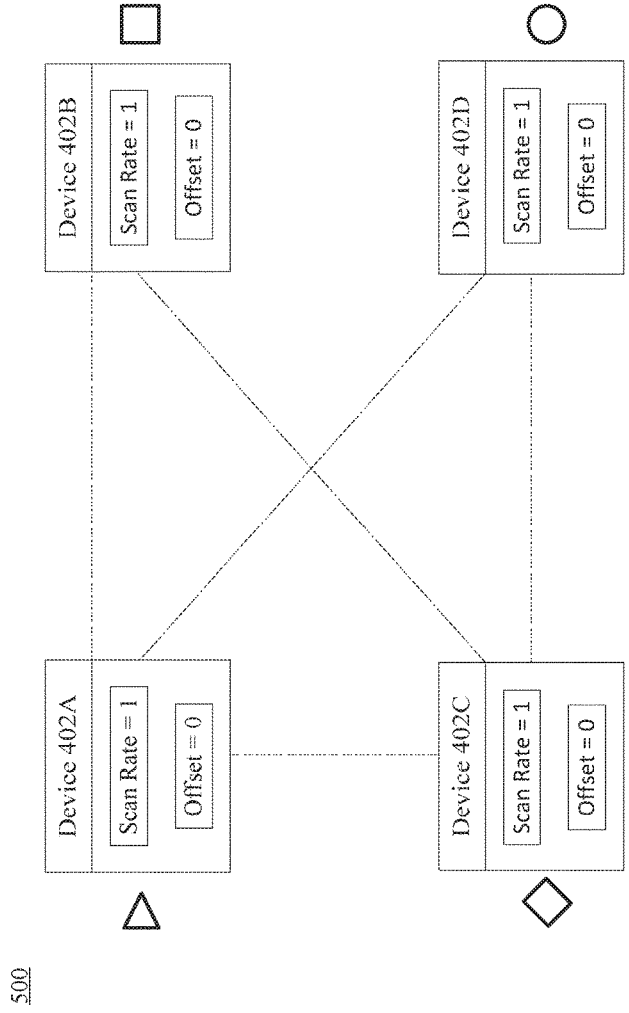
Figure 5A:
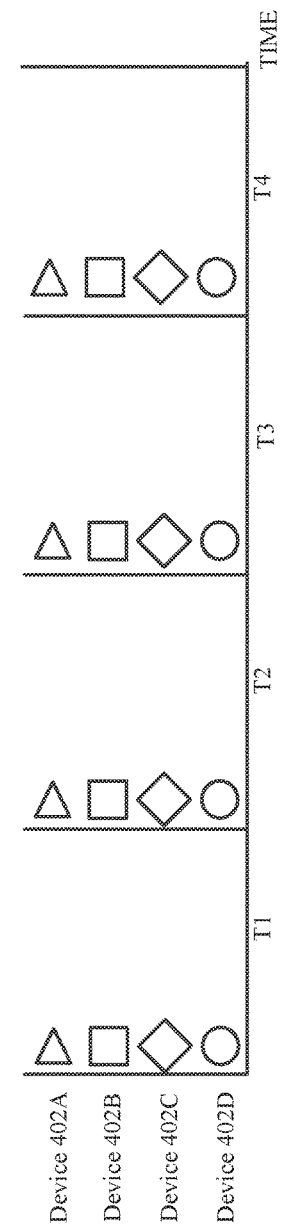
Figure 5B:
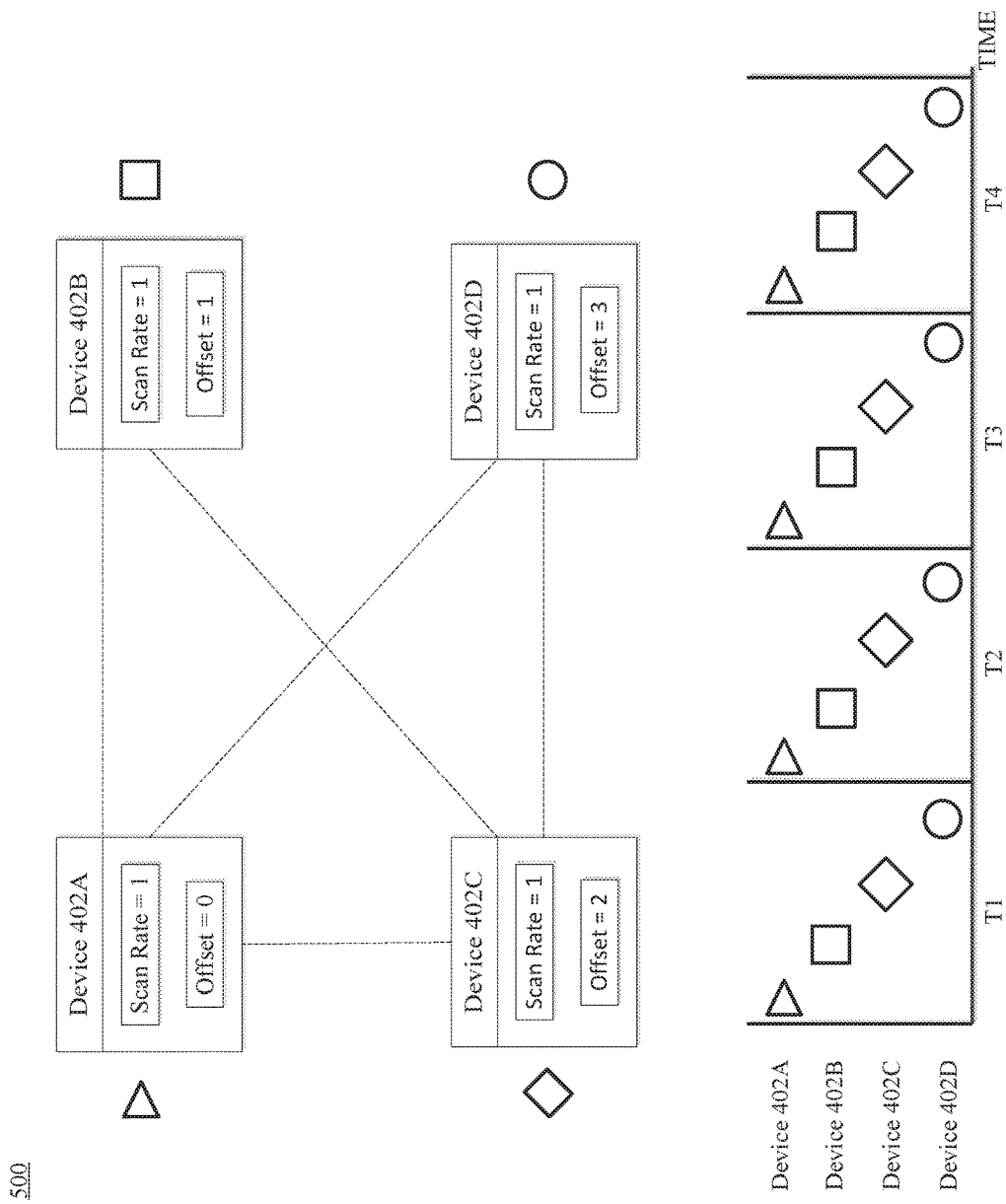

FIGS. 5A-5D illustrate exemplary scan sequences for a networked sensor array 500 according to examples of the disclosure. In the illustrated examples, a specific shape is used to represent a sample of data from a sensor of the particular device (e.g., one of the sensors 440A-440D from each device). A triangle is associated with sensor measurements originating on device 402A, a square is associated with sensor measurements originating on device 402B, a diamond is associated with sensor measurements originating on device 402C, and a circle is associated with sensor measurements originating on device 402D. For the purposes of illustration, it can be understood that each of the sensor measurements from the different devices 402A-402D can correspond to a same type of sensor (e.g., a GPS position sensor) and that data can be shared between the respective devices. For each of the devices 402A-402D, values of two exemplary parameters (e.g., parameters 441A-441D above) are illustrated. The two exemplary parameters are Scan Rate and Offset. The parameter Scan Rate can be used to control the scan frequency for a sensor of each device 402A-402D. For the purposes of the explanation of FIGS. 5A-5C, it can be assumed that a value of Scan Rate=1 corresponds to a scan period equal to the width of time intervals T1-T4. In some examples, an Offset parameter can be used to set a time or phase offset for relative scan timing of the different sensors. When the devices 402A-402D are operating in a standalone mode, the value Offset may not be significant. However, the value of Offset can be a useful parameter for coordinating operation of sensors participating in a networked sensor array 500. The values assigned to both Scan Rate and Offset in the examples of FIGS. 5A-5C are merely illustrative of concepts and it should be understood that the specific implementation of parameters, the data types used to express the paramaters, and their values can vary while remaining within the scope of the present disclosure.

FIG. 5A illustrates a coordinated simultaneous scan sequence for sensors (e.g., 440A-440D above) belonging to devices 402A-402D. As shown in FIG. 5A, each of the devices 402A-402D is set with the parameter Scan Rate=1.

In some examples, the value of Scan Rate=1 can correspond to a nominal scan rate for the sensors of each device when the devices 402A-402D are not connected to a networked sensor array 500 (also referred to as a standalone scan rate). Prior to joining the networked sensor array 500, it is likely that the sensor scans of each of the devices 402A-402D can be completely unsynchronized even if the sensors are operating at a nominally identical frequency. As described above, during the handshaking stage, the devices 402A-402D (and their corresponding sensors) can perform time synchronization, including establishing a common time-base. In some examples, the value for Offset can be relative to the synchronized time-base of the sensors after the handshaking step described above. In FIG. 5A, the parameters are set to Scan Rate=1 and Offset=0 for all of the devices 402A-402D. The timing diagram in the bottom of FIG. 5A shows the resulting sensor scan pattern has all four devices performing sensor scans at the same time, once per successive time interval T1-T4. In FIGS. 5A-5D and 6A-6B, a triangle, square, diamond, or circle appearing in the timeline can indicate that a sample was taken by the corresponding sensor. In the configuration of FIG. 5A, four data samples can be available at each sampling time, and the increased amount of data relative to each device's individual data capture can allow for error correction or statistical analysis based on the larger data set (e.g., networked sensor data 318 above). In some examples, to the extent that extraneous variables (e.g., 306 above) for each sensor (e.g., 440A-440D above) are random, performing an average of the sensor data samples (e.g., networked sensor data 318 above) from each device 402A-402D can tend to cancel out the influence of extraneous variables, and the average value can more accurately represent the independent variable (e.g., 304 above) to be measured. In some examples, the sensor data from the four sensors (e.g., networked sensor data 318 above) corresponding to devices 402A-402D can be compared and outlier data values can be detected based on the comparison. In some examples, sensor data between the different devices 402A-402D can be shared (e.g., networked sensor data 318 above) to replace erroneous or missing data of one of the devices during a particular time interval T1-T4 as will be described in more detail below regarding FIGS. 6A-6B.

FIG. 5B illustrates a second exemplary scan sequence for sensors (e.g., 440A-440D) belonging to devices 402A-402D according to examples of the disclosure. Similar to FIG. 5B above, each device 402A-402D is illustrated having a Scan Rate=1 value. However, each of the devices 402A-402D is illustrated having a different Offset values from 0-3, which can represent a phase offset (or time offset relative to the common time-base described above) for the sampling at the frequency associated with Scan Rate=1. As illustrated, each of the scans corresponding to devices 402B-402D (i.e., squares, diamonds, and circles) can be offset from the scan corresponding to device 402A (i.e., triangles) by the respective value of Offset*90 degrees. In some examples, in the networked sensor array 500 configuration, the devices 402A-402D can share all of the collected data. In some examples, the scan sequence of FIG. 5B can be referred to as an interleaved sensor scan. In some examples, as each device receives data from the other devices, the effective scan rate of the aggregated data can be equal to four times the scan rate of each individual device. In other words, the aggregate sensor scan sequence can be identical to a single sensor operating at Scan Rate=4.

FIG. 5C illustrates a third exemplary scan sequence for sensors (e.g., 440A-440D) belong to devices 402A-402D according to examples of the disclosure. Compared to FIGS. 5A and 5B, the Scan Rate parameter for all four devices 402A-402D can be set to a Scan Rate=0.5 value. The Scan Rate=0.5 value can correspond to a scan rate at half of the frequency of Scan Rate=1 above, and thus can have a corresponding period that is twice as long (e.g., corresponding to time intervals T5 and T6). With Offset Values from 0-3 as in FIG. 5B, the sensor scans for the different devices 402A-402D can be offset by Offset*90 degrees relative to the longer period (i.e., T5-T6) at the reduced scan rate. Despite the reduction of scan rate of each individual sensor, the aggregate scan rate from all sensors can still result in a scan rate at twice the frequency of Scan Rate=1. In some examples, each individual sensor operating at Scan Rate=0.5 can consume less power due to the slower scan rate, with a potential upper limit on power reduction of 50%. For portable devices (e.g., 136, 140, 148, or 150 above), the power saving afforded by a reduced scan rate can potentially extend the battery life of the device. Thus, by performing sensor scans with the scan sequence illustrated in FIG. 5C and sharing sensor data via the networked sensor array 500, the effective scan rate of the sensors can be increased while the individual scan rate for each device can be decreased, which can save power.

Figure 5D:
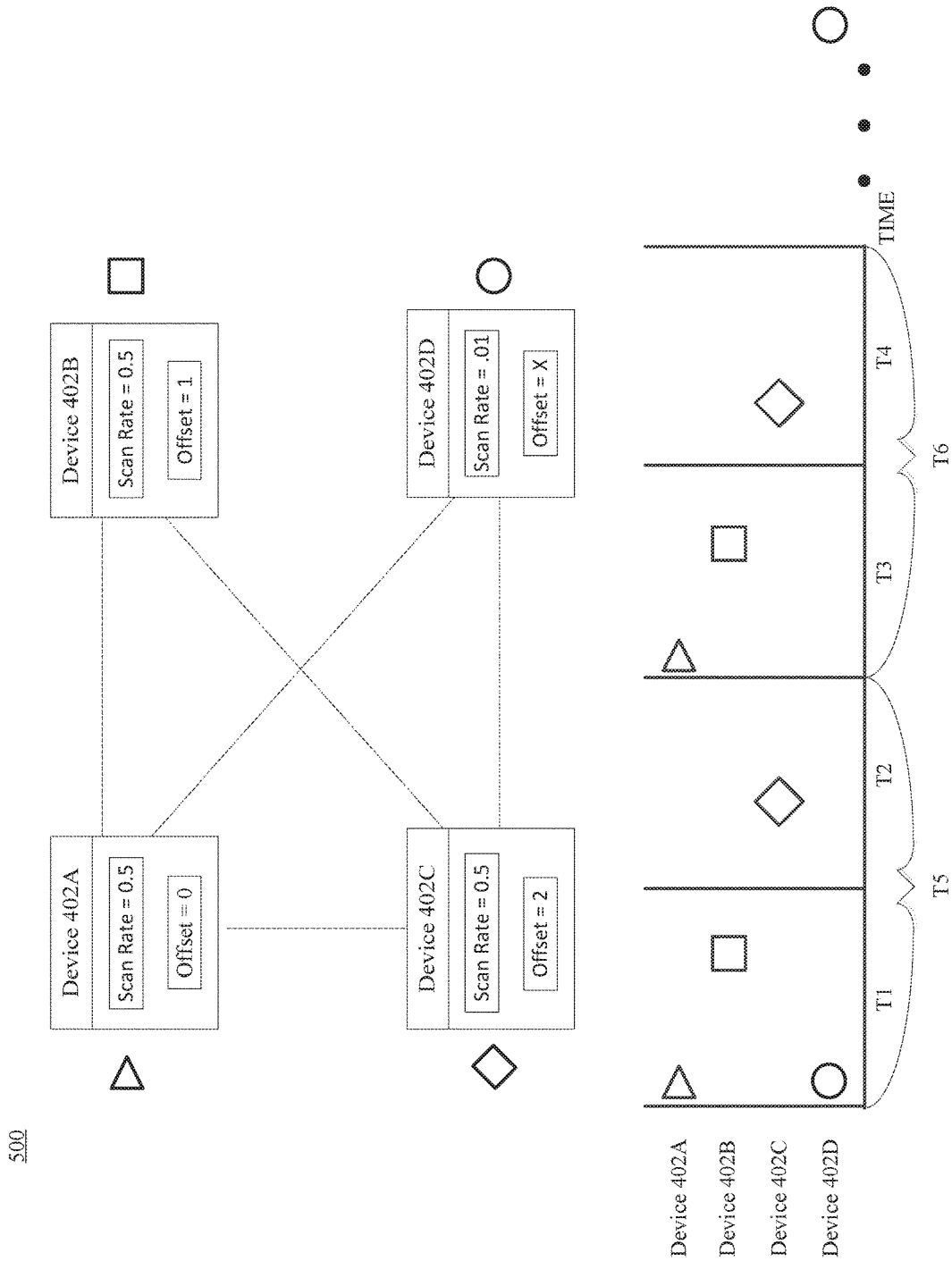
Figure 6A:
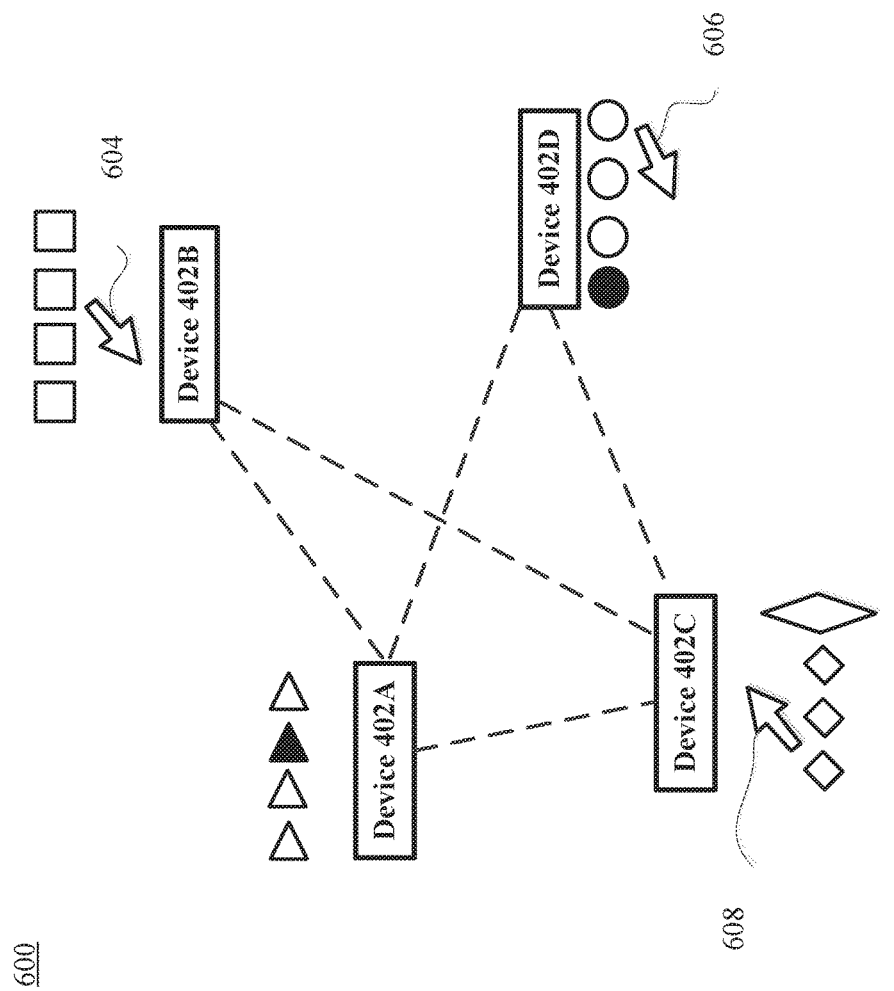
FIGS. 6A-6B illustrate an exemplary error correction scheme that can be implemented in a networked sensor array according to examples of the disclosure.
Figure 6B:
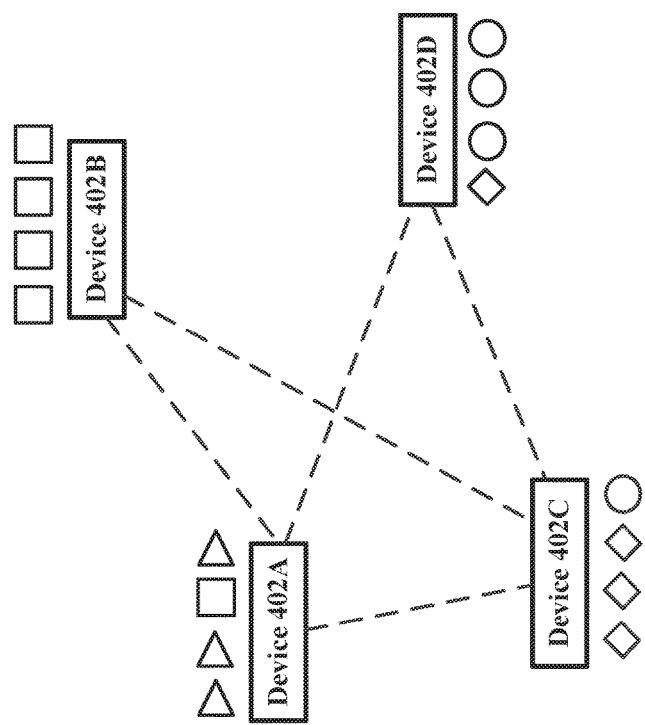

FIG. 5D illustrates an exemplary scan sequence for networked sensor array 500 that can utilize different scan rates for sensors in different devices 402A-402D. In some examples, one or more of the devices 402A-402D in the networked sensor array 500 may be unable to perform data scanning at the full data rate. For example, the device 402D in FIG. 5D may be a device having a low battery condition. In some examples, the device 402D can be set to scan at a much lower rate than the remaining devices in the networked sensor array 500. As a result, a user that is participating in a group exercise activity in such circumstances may still be able to obtain sensor data from the activity despite the user's device 402D being unable to operate its own sensors at a full data rate. As illustrated, the devices 402A-402C can be set with Scan Rate=0.5 as above in FIG. 5C, with respective offsets of 0, 1, and 2. As illustrated in the timing diagram, the sensor samples for devices 402A-402C can be evenly spaced and interleaved analogously to FIG. 5C above. In some examples, the scan rate for device 402D can be reduced to a lower level than the devices 402A-402C (e.g., by one or more orders of magnitude). In the illustrated example, Scan Rate=0.01 is shown for device 402D, which can correspond to one scan of the sensor in device 402D for every 50 scans of the sensors in devices 402A-402C. Accordingly the second scan of the sensor in device 402D is illustrated far off to the right of the timescale. In some examples, this minimal amount of sensor scanning can be used as a verification that the device 402D did in fact continue to participate in the group activity, ensuring that data shared from devices 402A-402C would accurately represent the activity of the user of device 402D as well. In some examples, device 402D can stop scanning its sensors completely when its power level becomes too low or runs out completely. A user may be able to connect the device 402D to an alternative power source to recharge the device's battery, and once a sufficient battery level is reached, the device 402D can request data corresponding to the down time from the networked sensor array 500. As a result, using the above scan sequence, a user that may have otherwise been unable to successfully record data from an activity can use data from a networked sensor array 500 to bridge the gap in data. Thus, the examples in FIGS. 5A-5D illustrate just a few examples of how sensor parameters can be controlled in a networked sensor array 500 to obtain different types of benefits over completely independent sensor scanning by devices 402A-402D. FIGS. 6A-6B below describe in more detail how a networked sensor array can be used for error correction.

It should be understood from FIGS. 5A-5D that variations of Scan Rate and Offset values can be used to provide different trade-offs between data sampling, data rate, and power consumption. For example, with a scan rate of 0.25 and an interleaved scan as illustrated in FIGS. 5B-5C, an effective scan rate of 1 can be produced while potentially reducing the power consumption of each individual sensor by up to 75%. In some examples, the balance between power saving and data rate can be determined at the handshaking step described above regarding FIG. 4 and can depend on the number of devices participating in the networked sensor array, the battery levels of the devices participating in the networked sensor array, and/or the requirements of a particular type of group exercise activity, among other factors.

FIGS. 6A-6B illustrate an exemplary error correction scheme that can be implemented in a networked sensor array 600 according to examples of the disclosure. The devices in networked sensor array 600 can, for example, be configured with the timing configuration illustrated in FIG. 5A, wherein each device is sampling at a common Scan Rate and a common Offset value. In such a configuration, each device 402A-402D can perform synchronized sampling of sensor data at the Scan Rate. A short exemplary sequence of four data samples for each device 402A-402D is illustrated in FIG. 6A. In some examples, device 402B can have four normal data samples illustrated as four white shaded squares of equal size. In some examples, devices 402A and 402D can each have missing data samples during the exemplary sequence of four samples. The device 402A is shown with a missing third data sample illustrated as a black shaded triangle, and device 402D is shown with a missing first data sample illustrated as a black shaded circle. Device 402C is shown with a fourth sample that is an erroneous data point (e.g., with a large deviation from an expected values) illustrated as a white shaded diamond that is significantly larger than the first three white shaded diamond sensor samples of device 402C.

In some examples, each of the devices 402A, 402C, and 402D can request replacement data samples (e.g., networked sensor data 318 above) from the networked sensor array 600 for the missing and/or erroneous data samples described above. In some examples, device 402B can send data from the third data sample time (e.g., as represented by arrow 604) to device 402A in response to receiving a request for data from the third sample time. In some examples, device 402C or 402D could also send data from the third data sample time to device 402A in response to receiving a request for data from the third sample time. In some examples, device 402A can use data from all three data samples (e.g., one each from device 402B-402D) as a replacement for the missing data point in device 402A's data. In some examples, the increased number of data samples can be used to obtain a more accurate data value (e.g., based on averaging or other statistical analysis of data from sensors belonging to different devices 402A-402D). In some examples, device 402A can select any one of the received samples (e.g., third data samples from devices 402B-402D) to use to replace the sample that was missed during the third data sample time. In some examples, one or more of the devices can perform a supervisory function for coordinating transfer for data between devices 402A-402D. The process for replacing samples can be repeated for replacing the erroneous data sample at the fourth sample time of device 402C (as represented by arrow 606) and for replacing the missing data sample at the first sample time of device 402D (as represented by arrow 608). In some examples, the device performing the supervisory function (e.g., a server or a relay) can receive all of the requests for data based on missing or erroneous data, and can coordinate transfer of sensor data between devices connected to the networked sensor array. In some examples, a device having a larger battery capacity and/or more available battery power can be selected during the handshaking step above to act as the server or relay. FIG. 6B illustrates the final state of the data for each of the devices 402A, and shows the end result of data sharing illustrated by arrows 604, 606, and 608 above. Thus, in some examples, despite some missed and/or erroneous samples during a sample time interval, each device 402A-402D can have a complete data set after data is shared among the devices over the networked sensor array 600. FIG. 6B illustrates each device having a complete data set (e.g., at least one valid data value for each sample time) with at least some of the data for devices 402A, 402C, and 402D having come from other devices that are part of the networked sensor array 600.

Figure 7:
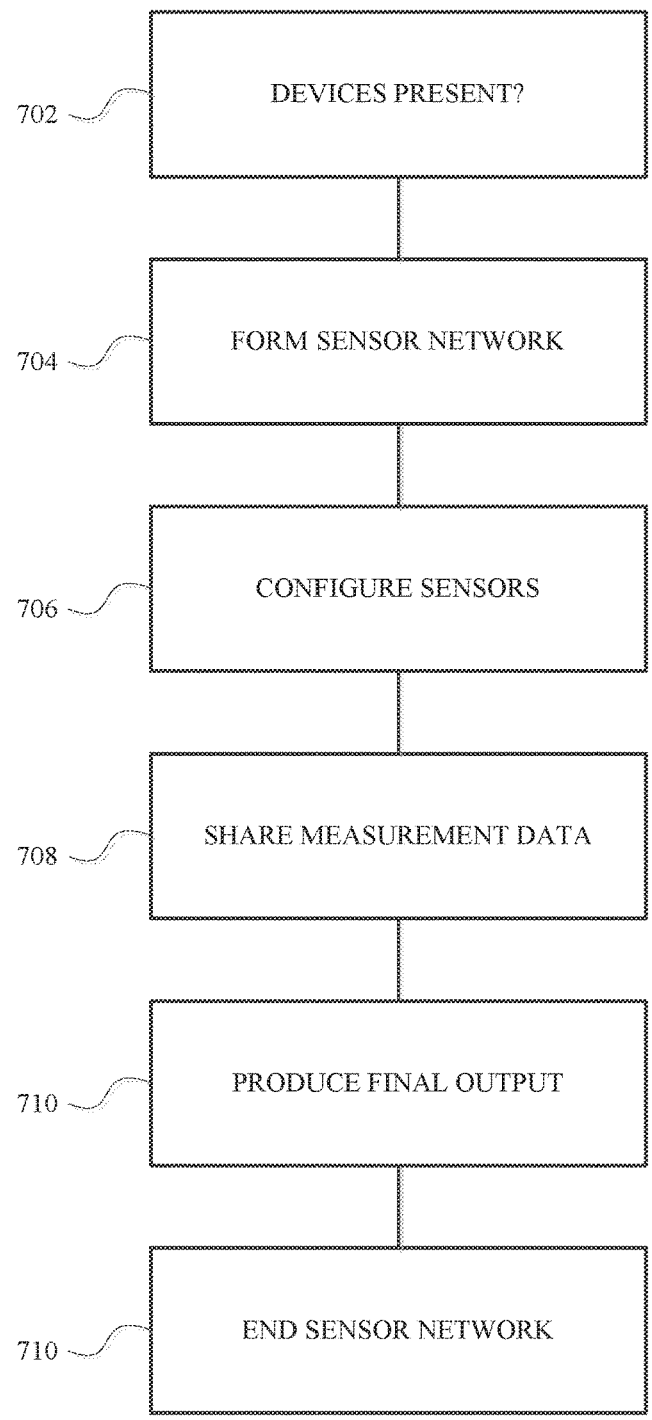
FIG. 7 illustrates an exemplary process for connecting a device to a networked sensor array and operating the device within the networked sensor array according to examples of the disclosure.

FIG. 7 illustrates an exemplary process 700 for connecting a device (e.g., device 300A above) to a networked sensor array (e.g., 312 above) and operating the device within the networked sensor array according to examples of the disclosure. In the examples below, it can be understood that process 700 is a process being performed (e.g., by processor 202 above) on one device (e.g., device 300A above) that is capable of participating in a networked sensor array. In some examples, at step 702, the process 700 can determine whether other devices capable of forming a networked sensor array (e.g., 312 above) are present in proximity to the device that is running process 700. In some examples, step 702 of process 700 can be configured to periodically scan for devices capable of forming a networked sensor array. In some examples, the device can broadcast a type of activity that it is participating in, and can also recognize other devices that are engaging in the same activity and are capable of potentially forming a networked sensor array for the broadcasted type of activity. In some examples, step 702 of process 700 can wait for a user input before attempting to detect other devices capable of joining a networked sensor array (e.g., 312 above). In some examples, once devices capable of joining the networked sensor array are detected, the process 700 can proceed to step 704. At step 704, process 700 can cause the device to join the networked sensor array. It should be understood that the networked sensor array may not be a pre-existing sensor array, and that in some examples, process 704 can also include the step of forming the networked sensor array between two or more devices. In some examples, at step 704, the user can receive an opt-in prompt (e.g., a graphical display, a sound, or haptic feedback) prior to the device joining the network. In some examples, the user may have to manually grant permission for the device to join the networked sensor array. In some examples, the process 700 can be configured to automatically join a networked sensor array with designated devices. In some examples, the device can broadcast a type of activity that it is participating in, and can also recognize other devices that are engaging in the same activity and are capable of potentially forming a networked sensor array for the broadcasted type of activity. In some examples, at step 704 the devices that will be participating in the networked sensor array (e.g., 312 above) can negotiate network connections particular to the connection protocol being used (e.g., Bluetooth, Wi-Fi, etc.). In some examples, once the device has joined the networked sensor array with other nearby devices at step 704, the process 700 can proceed to step 706. In some examples, at step 706, the process 700 can configure the device's sensors to allow for sharing of data between the devices participating in the networked sensor array. In some examples, at step 706, process 700 can perform the handshaking steps with other devices participating in the networked sensor array as described above regarding FIG. 4. In some examples, once the sensors have been configured at step 706, the process 700 can proceed to step 708. In some examples, at step 708 the process 700 can share measurement data between the device and other devices in the networked sensor array. In some examples, the data shared at step 708 can vary depending on the chosen data sharing scheme determined at step 704 and configured at step 706. FIGS. 4-6 above describe several examples of data sharing schemes that can be performed at step 708 of process 710. At step 710, process 700 can produce a final output based on the shared data at step 708. In some examples, each device participating in the networked sensor array can produce a final output value independently. In some examples, step 710 of process 700 can occur only once at the end of a group activity. In some examples, step 710 of process 700 can occur at intervals during the group activity to provide updates to the devices while the activity is occurring. In some examples, the intervals can be periodic. In some examples, the intervals can correspond to a significant even or milestone in the group activity. In some examples, the frequency of performing step 710 can depend on a battery capacity of the device. In some examples, process 700 can act as a server, relay, or master device, receiving data from one or more of the other devices in the networked sensor array at step 708. In some examples, process 700 can subsequently produce a final output value based on the aggregated data from all of the devices participating in the networked sensor array. In some examples, once the final output value is produced at step 708, process 700 can proceed to step 710. In some examples, process 700 can end the networked sensor array at step 710. In some examples, ending the networked sensor array at 710 can include disconnecting from the networked sensor array. In some examples, ending the network sensor array at step 710 include restoring standalone parameter (e.g., parameters 441A-441D above) that may have been altered during the handshaking step 706 above.

Therefore, according to the above, some examples of the disclosure are directed to an electronic device comprising: a first sensor configured to measure a first type of sensor data at a first sampling rate, and a communication interface configured to: detect a proximity of one or more network capable devices, different from the electronic device, form a sensor network with at least one of the one or more network capable devices, exchange operational parameters with the at least one of the one or more network capable devices, and coordinate data measurement by the first sensor based on the exchanged operational parameters. Additionally or alternatively to one or more of the examples disclosed above, in some examples, coordinating measuring of data by the first sensor based on the exchanged data comprises reducing the sample rate of the first sensor below the first sampling rate. Additionally or alternatively to one or more of the examples disclosed above, in some examples, coordinating measuring of data by the first sensor further comprises selecting the reduced sampling rate of the first sensor based on a total number of devices participating in the sensor network having sensors capable of measuring the first type of sensor data. Additionally or alternatively to one or more of the examples disclosed above, in some examples, the electronic device further comprises a processor configured to: determine whether data values measured by the first sensor are missing, and in accordance with a determination that one or more data values measured by the first sensor are missing, receive replacement data for the missing data from the at least one of the one or more network capable devices. Additionally or alternatively to one or more of the examples disclosed above, in some examples, the electronic device further comprises a processor configured to: determine whether data values measured by the first sensor are outside of an expected measurement range, and in accordance with a determination that one or more data values measured by the first sensor are outside of the expected measurement range, receive replacement data for the data outside of the expected measurement range from the at least one of the one or more network capable devices. Additionally or alternatively to one or more of the examples disclosed above, in some examples, coordinating measuring of data by the first sensor based on the received sensor scan rate comprises reducing the sample rate of the first sensor below the first sampling rate, wherein an aggregate data rate of the sensor network including the first sensor is equal to or exceeds the first sampling rate for the first sensor. Additionally or alternatively to one or more of the examples disclosed above, in some examples, the communication interface is further configured to: receive data from the second sensor belonging to at least one of the one or more network capable devices, and based on data from the first sensor and data from the second sensor, calculate a combined measurement value to remove effects of extraneous variables in measurement data from the first sensor.

Some examples of the disclosure are directed to a method comprising: measuring a first type of sensor data at a first sensor sampling rate, detecting a proximity of one or more network capable devices, forming a sensor network with at least one of the one or more network capable devices, exchanging operational parameters with the at least one of the one or more network capable devices, and coordinating data measurement by the first sensor based on the received sensor scan rate and offset data for the second sensor. Additionally or alternatively to one or more of the examples disclosed above, in some examples, coordinating measuring of data by the first sensor based on the exchanged data comprises reducing the sample rate of the first sensor below the first sampling rate. Additionally or alternatively to one or more of the examples disclosed above, in some examples, coordinating measuring of data by the first sensor further comprises selecting the reduced sampling rate of the first sensor based on a total number of devices participating in the sensor network having sensors capable of measuring the first type of sensor data. Additionally or alternatively to one or more of the examples disclosed above, in some examples, the method further comprises determining whether data values measured by the first sensor are missing, and in accordance with a determination that one or more data values measured by the first sensor are missing, receiving replacement data for the missing data from the at least one of the one or more network capable devices. Additionally or alternatively to one or more of the examples disclosed above, in some examples, the method further comprises determining whether data values measured by the first sensor are outside of the expected measurement range, and in accordance with a determination that one or more data values measured by the first sensor are outside of the expected measurement range, receiving replacement data for the data outside of the expected measurement range from the at least one of the one or more network capable devices. Additionally or alternatively to one or more of the examples disclosed above, in some examples, coordinating measuring of data by the first sensor based on the received sensor scan rate comprises reducing the sample rate of the first sensor below the first sampling rate, wherein an aggregate data rate equal to or exceeds the first sampling rate for the first sensor. Additionally or alternatively to one or more of the examples disclosed above, in some examples, the method further comprises receiving data from the second sensor belonging to at least one of the one or more network capable devices, and based on data from the first sensor and data from the second sensor, calculating a combined measurement value to remove effects of extraneous variables in measurement data from the first sensor.

Some examples of the disclosure are directed to a non-transitory computer-readable medium including instructions, which when executed by one or more processors, cause the one or more processors to perform a method comprising: measuring a first type of sensor data at a first sensor sampling rate, detecting a proximity of one or more network capable devices, forming a sensor network with at least one of the one or more network capable devices, exchanging operational parameters with the at least one of the one or more network capable devices, and coordinating data measurement by the first sensor based on the received sensor scan rate and offset data for the second sensor.

Additionally or alternatively to one or more of the examples disclosed above, in some examples, coordinating measuring of data by the first sensor based on the exchanged data comprises reducing the sample rate of the first sensor below the first sampling rate. Additionally or alternatively to one or more of the examples disclosed above, in some examples, coordinating measuring of data by the first sensor further comprises selecting the reduced sampling rate of the first sensor based on a total number of devices participating in the sensor network having sensors capable of measuring the first type of sensor data. Additionally or alternatively to one or more of the examples disclosed above, in some examples, the method further comprises determining whether data values measured by the first sensor are missing, and in accordance with a determination that one or more data values measured by the first sensor are missing, receiving replacement data for the missing data from the at least one of the one or more network capable devices. Additionally or alternatively to one or more of the examples disclosed above, in some examples, the method further comprises determining whether data values measured by the first sensor are outside of the expected measurement range, and in accordance with a determination that one or more data values measured by the first sensor are outside of the expected measurement range, receiving replacement data for the data outside of the expected measurement range from the at least one of the one or more network capable devices. Additionally or alternatively to one or more of the examples disclosed above, in some examples, coordinating measuring of data by the first sensor based on the received sensor scan rate comprises reducing the sample rate of the first sensor below the first sampling rate, wherein an aggregate data rate equal to or exceeds the first sampling rate for the first sensor. Additionally or alternatively to one or more of the examples disclosed above, in some examples, the method further comprises receiving data from the second sensor belonging to at least one of the one or more network capable devices, and based on data from the first sensor and data from the second sensor, calculating a combined measurement value to remove effects of extraneous variables in measurement data from the first sensor.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. An electronic device comprising:
    a first sensor configured to measure a first type of sensor data at a first sampling rate; and
    a communication interface configured to:
        detect a proximity of one or more network capable devices, different from the electronic device;
        form a sensor network with at least one of the one or more network capable devices;
        exchange operational parameters with the at least one of the one or more network capable devices; and
        coordinate data measurement by the first sensor based on the exchanged operational parameters, wherein coordinating measuring of data by the first sensor based on the received sensor scan rate comprises operating the first sensor in a reduced power mode and reducing the sample rate of the first sensor below the first sampling rate, wherein an aggregate data rate of the sensor network including the first sensor is equal to or exceeds the first sampling rate for the first sensor.

2. The electronic device of claim 1, wherein coordinating measuring of data by the first sensor further comprises selecting the reduced sampling rate of the first sensor based on a total number of devices participating in the sensor network having sensors capable of measuring the first type of sensor data.

3. The electronic device of claim 1, further comprising a processor configured to:
    determine whether data values measured by the first sensor are missing; and
    in accordance with a determination that one or more data values measured by the first sensor are missing, receive replacement data for the missing data from the at least one of the one or more network capable devices.

4. The electronic device of claim 1, further comprising a processor configured to:
    determine whether data values measured by the first sensor are outside of an expected measurement range; and
    in accordance with a determination that one or more data values measured by the first sensor are outside of the expected measurement range, receive replacement data for the data outside of the expected measurement range from the at least one of the one or more network capable devices.

5. The electronic device of claim 1, wherein the communication interface is further configured to:
    receive data from the second sensor belonging to at least one of the one or more network capable devices; and
    based on data from the first sensor and data from the second sensor, calculate a combined measurement value to remove effects of extraneous variables in measurement data from the first sensor.

6. The electronic device of claim 1, wherein exchanging operational parameters with the at least one of the one or more network capable devices comprises transmitting an identification of the first type of sensor data that the first sensor is configured to measure.

7. The electronic device of claim 1, wherein exchanging operational parameters with the at least one of the one or more network capable devices comprises transmitting a battery power level of the electronic device and receiving a battery power level from at least one of the one or more network capable devices.

8. A method comprising:
measuring a first type of sensor data at a first sensor sampling rate;
detecting a proximity of one or more network capable devices;
forming a sensor network with at least one of the one or more network capable devices;
exchanging operational parameters with the at least one of the one or more network capable devices; and
coordinating data measurement by the first sensor based on the received sensor scan rate and offset data for the second sensor.

9. The method of claim 8, wherein coordinating measuring of data by the first sensor based on the exchanged data comprises reducing the sample rate of the first sensor below the first sampling rate.

10. The method of claim 9, wherein coordinating measuring of data by the first sensor further comprises selecting the reduced sampling rate of the first sensor based on a total number of devices participating in the sensor network having sensors capable of measuring the first type of sensor data.

11. The method of claim 8, further comprising:
determining whether data values measured by the first sensor are missing; and
in accordance with a determination that one or more data values measured by the first sensor are missing, receiving replacement data for the missing data from the at least one of the one or more network capable devices.

12. The method of claim 8, further comprising:
determining whether data values measured by the first sensor are outside of the expected measurement range; and
in accordance with a determination that one or more data values measured by the first sensor are outside of the expected measurement range, receiving replacement data for the data outside of the expected Measurement range from the at least one of the one or more network capable devices.

13. The method of claim 8, wherein coordinating measuring of data by the first sensor based on the received sensor scan rate comprises reducing the sample rate of the first sensor below the first sampling rate, wherein an aggregate data rate equal to or exceeds the first sampling rate for the first sensor.

14. The method of claim 8, further comprising:
receiving data from the second sensor belonging to at least one of the one or more network capable devices; and
based on data from the first sensor and data from the second sensor, calculating a combined measurement value to remove effects of extraneous variables in measurement data from the first sensor.

15. An electronic device comprising:
a first sensor configured to measure a first type of sensor data at a first sampling rate; and
a communication interface configured to:
detect a proximity of one or more network capable devices, different from the electronic device;
form a sensor network with at least one of the one or more network capable devices;
exchange operational parameters with the at least one of the one or more network capable devices;
coordinate data measurement by the first sensor based on the exchanged operational parameters; and
a processor configured to:
determine whether data values measured by the first sensor are missing or erroneous; and
in accordance with a determination that one or more data values measured by the first sensor are missing or erroneous, receive replacement data for the one or more missing or erroneous data values from the at least one of the one or more network capable devices.

16. The electronic device of claim 15, wherein exchanging operational parameters with the at least one of the one or more network capable devices comprises transmitting an identification of the first type of sensor data that the first sensor is configured to measure.

17. The electronic device of claim 15, wherein exchanging operational parameters with the at least one of the one or more network capable devices comprises transmitting a battery power level of the electronic device and receiving a battery power level from at least one of the one or more network capable devices.

18. An electronic device comprising:
a first sensor configured to measure a first type of sensor data at a first sampling rate: and
a communication interface configured to:
detect a proximity of one or more network capable devices, different from the electronic device;
form a sensor network with at least one of the one or more network capable devices;
exchange operational parameters with the at least one of the one or more network capable devices;
coordinate data measurement by the first sensor based on the exchanged operational parameters; and
receive data from the second sensor belonging to at least one of the one or more network capable devices; and
based on measured data from the first sensor and received data from the second sensor, calculate a combined measurement value to remove effects of extraneous variables in measurement data from the first sensor.

19. The electronic device of claim 18, wherein exchanging operational parameters with the at least one of the one or more network capable devices comprises transmitting an identification of the first type of sensor data that the first sensor is configured to measure.

20. The electronic device of claim 18, wherein exchanging operational parameters with the at least one of the one or more network capable devices comprises transmitting a battery power level of the electronic device and receiving a battery power level from at least one of the one or more network capable devices.

* * * * *